United States Patent
Villaume et al.

(10) Patent No.: US 7,305,285 B2
(45) Date of Patent: Dec. 4, 2007

(54) METHOD AND DEVICE FOR PILOTING AN AIRCRAFT

(75) Inventors: Fabrice Villaume, Tournefeuille (FR); Jean Duprez, Tournefeuille (FR)

(73) Assignee: Airbus France, Tournefeuile (FR)

( * ) Notice: Subject to any disclaimer, the term of this patent is extended or adjusted under 35 U.S.C. 154(b) by 569 days.

(21) Appl. No.: 10/836,398

(22) Filed: May 3, 2004

(65) Prior Publication Data

US 2004/0230353 A1    Nov. 18, 2004

(30) Foreign Application Priority Data

May 14, 2003   (FR) .................................. 03 05764

(51) Int. Cl.
*B64C 15/00* (2006.01)
(52) U.S. Cl. .......................... 701/3; 244/178
(58) Field of Classification Search ............... 701/3, 701/4, 14, 15, 16, 18; 244/100 R, 178, 183, 244/76 J, 76 R, 76 C, 87, 88, 89; 318/583, 318/586, 584
See application file for complete search history.

(56) References Cited

U.S. PATENT DOCUMENTS

| | | | |
|---|---|---|---|
| 3,361,392 A * | 1/1968 | Jerry et al. ................. 244/184 |
| 3,521,839 A * | 7/1970 | Diani .......................... 244/197 |
| 4,482,961 A | 11/1984 | Kilner et al. |
| 4,533,999 A * | 8/1985 | Lambregts .................... 701/17 |
| 4,935,682 A * | 6/1990 | McCuen ...................... 318/586 |
| 5,008,825 A | 4/1991 | Nadkarni et al. |
| 5,375,793 A | 12/1994 | Rivron et al. |
| 5,446,666 A * | 8/1995 | Bauer ............................ 701/4 |
| 6,241,183 B1 | 6/2001 | Mathieu |

FOREIGN PATENT DOCUMENTS

| FR | 2694738 | 2/1994 |
|---|---|---|
| FR | 2770824 | 5/1999 |

OTHER PUBLICATIONS

Preliminary Search Report dated Jan. 22, 2004 with English translation.

* cited by examiner

*Primary Examiner*—Dalena Tran
(74) *Attorney, Agent, or Firm*—Stevens, Davis, Miller & Mosher, LLP (57) ABSTRACT

A piloting device may include a section for generating control orders for the control surfaces acting on the yaw movement of an aircraft. A central unit determines an instruction to rotate the aircraft, based on control orders, and determines a global moment to be applied to the aircraft about the yaw axis so that the aircraft performs the rotation instruction. The central unit divides the global moment into a sum of elementary moments and computes, for each control surface, the instruction to be applied to its actuator so that the latter generates the associated elementary moment.

43 Claims, 4 Drawing Sheets

METHOD AND DEVICE FOR PILOTING AN AIRCRAFT

FIELD OF THE INVENTION

The present invention relates to a method and a device for piloting an aircraft, in particular a civil transport aircraft, traveling on the ground.

BACKGROUND OF THE RELATED ART

In the context of the present invention, traveling on the ground means any possible type of traveling of an aircraft, such as traveling on a runway during landing and take-off phases, traveling on taxiways or traveling on maneuvering areas, in particular.

When an aircraft, in particular an airplane, travels on the ground on a runway on manual pilot, the pilot steers the wheels of the front landing gear and the tail fin rudder control surface in order to follow substantially the required trajectory. This trajectory may be a straight line or a curve and may correspond in this case to a maneuver of the aircraft, for example to enter an exit road. To do this, the pilot acts on the control members (control column pedals, steering wheel to steer the front landing gear wheels), the output signals (or orders) of which are (directly) sent as instructions to the actuators of the front landing gear and of the tail fin rudder control surface.

In practice, said output signals of the control members are usually simply formatted before being sent as instructions, by appropriate functional blocks, which merely apply a variable gain to said instruction signals: for example a neutral range around the rest position, then a first gain value, then a second gain value greater than the first.

Such a mode of operation has drawbacks. In particular, it constitutes a considerable workload for the pilot who, during traveling on the ground, must constantly act on the control members steering the wheels of the front gear and the tail fin rudder control surface, in order to follow the required trajectory. This constraint is made more severe when the required trajectory is a curve. Sometimes, the pilot is required to act simultaneously on a plurality of said control members in order to follow this trajectory satisfactorily, while managing the response time of the control surfaces to a given order by means of said control members, which naturally requires constant attention on the part of the pilot which is particularly tiring.

In addition, when the traveling on the ground is done with the aid of an automatic pilot, for example when traveling on landing, a traveling law controls the actuators of the different control surfaces, as a function of the positional error of the aircraft relative to the center line of the runway, which is determined by using at least one of the various usual location means (ILS, MLS, GLS, DGPS, etc.). This traveling law has the disadvantage of being awkward to fine-tune and of being specific to the model of aircraft in question.

SUMMARY OF THE INVENTION

The subject of the present invention is a method of piloting an aircraft traveling on the ground which remedies the abovementioned drawbacks.

Accordingly, said piloting method is remarkable according to the invention in that, automatically:

a) an instruction to rotate the aircraft is determined;
b) a global moment is determined having to be applied to the aircraft about the yaw axis so that said aircraft performs said rotation instruction;
c) said global moment is divided into a sum of elementary moments, each of which corresponds to the effect generated on the aircraft respectively by one of a plurality of control surfaces, each of said control surfaces representing a particular means that is capable of acting on the yaw movement of the aircraft and which is controlled by at least one actuator; and
d) for each of said control surfaces, an instruction is computed to be applied to the actuator of the corresponding control surface such that the latter generates the associated elementary moment.

Thus, thanks to the automatic division of the global moment as the sum of elementary moments and to the computation of the corresponding instructions which are then applied to the actuators of the various control surfaces, it is possible at each moment to choose the division (between the various control surfaces) that is the most appropriate (particularly the most effective), so that the lateral control of the aircraft is improved about the yaw axis.

In a particular embodiment, when the aircraft is on manual pilot, said rotation instruction (yaw speed of the aircraft, angle of orientation of the speed vector of the aircraft, etc.) is determined in step a), based on the orders generated by at least one control member of the aircraft (for example the control column or the steering wheel steering the wheels of the front landing gear) which is capable of being actuated by a pilot of said aircraft.

Thus, the pilot can enter instructions corresponding to the required lateral control of the aircraft, without concerning himself with the manner of performing this control by means of the various control surfaces suitable for applying it. The pilot therefore controls a global rotation of the aircraft rather than a plurality of different individual movements of the control surfaces.

Furthermore, advantageously, when the aircraft is on automatic pilot, said rotation instruction is determined in step a), based on the possible difference between the position of the aircraft on a runway on the ground and the center line of that runway. The piloting law used to determine said rotation instruction is much easier to produce than a traveling law of the abovementioned type.

In preference, in step a), the rotation instruction is a yaw speed instruction.

In a particular embodiment corresponding to manual piloting, advantageously the aircraft comprises, as control members, at least one control column and one steering wheel to steer the front landing gear of said aircraft, and in step a):

the order generated by the control column is converted directly into a first yaw speed instruction;
the order generated by the steering wheel is converted into an intermediate instruction of angle of orientation of the speed vector of the front landing gear, which is converted into a second yaw speed instruction; and
said first and second yaw speed instructions are added together to obtain a global yaw speed which represents said instruction to rotate the aircraft.

In a variant of this particular embodiment, said intermediate instruction of angle of orientation of the speed vector is multiplied by a limitation coefficient which depends on the longitudinal speed of the aircraft, the result obtained being converted into said second yaw speed instruction.

The abovementioned variant allows the performance of precise maneuvers (locking the wheels of the front landing gear at low speed to follow curves, or entering taxiways), and also the following of a runway center line, for example during the take-off or landing phase (using the orientation of the tail fin rudder control surface when at high speed, locking the wheels of the front gear at high speed not being recommended for following a runway center line when traveling on take-off and landing).

In the context of the present invention, a control surface is understood to be any means capable of modifying the lateral movement of the aircraft. Thus, advantageously, the following can be used as control surfaces:

the tail fin rudder control surface of the aircraft, which is steered, and the front landing gear, which is also steered; and/or at least two different landing gears of the aircraft, the braking of which is controlled in dissymmetrical manner; and/or at least two engines of the aircraft, disposed either side of the longitudinal axis of said aircraft, the thrust of which is controlled in dissymmetrical manner.

In a preferred embodiment, in step c), to divide said global moment into a sum of elementary moments associated respectively with different control surfaces, account is taken of at least one of the following criteria, relating to said control surfaces;

the hierarchy of the control surfaces;

the availability of the control surfaces;

the effectiveness of the control surfaces; and the level of authority of the control surfaces.

Furthermore, in a particular embodiment, use is made, as a control surface, of at least the front landing gear of the aircraft, which is steered, and, in step c), the global moment is divided as a function at least of the longitudinal speed of the aircraft.

In this case, advantageously:

when said longitudinal speed of the aircraft is lower than a first predetermined speed, the division is maximal on said front landing gear;

when said longitudinal speed of the aircraft is higher than a second predetermined speed which is higher than said first predetermined speed, the division is minimal on said front landing gear; and said division is decreasing with respect to said front landing gear between said first and second predetermined speeds.

This embodiment allows the performance of precise maneuvers, and the following of a runway center line, for example in the take-off or landing phase.

In a variant of embodiment:

when said longitudinal speed of the aircraft is lower than a first predetermined speed, the control by division mode is deactivated and a direct control of the front landing gear is applied;

when said longitudinal speed of the aircraft is higher than a second predetermined speed, which is higher than said first predetermined speed, the direct control is deactivated and only a control by division mode is applied; and between said first and second predetermined speeds, control moves progressively from direct control to the control by division mode.

Furthermore, in a preferred embodiment, use is made, as a control surface, of the front landing gear of the aircraft, which is steered, and the instruction to be applied to the corresponding actuator is the sum of a first front landing gear steering instruction determined in step d) and a second front landing gear steering instruction, generated by a specific open loop.

The present invention also relates to a device for piloting an aircraft traveling on the ground.

According to the invention, said piloting device of the type comprising:

means for generating control orders;

control surfaces each representing a particular means which is capable of acting on the yaw movement of the aircraft and which is controlled by at least one actuator; and a central unit which, based on said control orders, determines instructions to be applied to the actuators of said control surfaces, is remarkable in that said central unit comprises:

means for determining an instruction to rotate the aircraft, based on said control orders;

means for determining a global moment having to be applied to the aircraft about the yaw axis so that said aircraft performs said rotation instruction;

means for dividing said global moment into a sum of elementary moments, each of which corresponds to the effect generated on the aircraft respectively by said control surfaces; and means for computing, for each of said control surfaces, the instruction to be applied to the actuator of the corresponding control surface such that the latter generates the associated elementary moment.

BRIEF DESCRIPTION OF THE DRAWINGS

The figures in the appended drawing will clearly explain how the invention can be implemented. In these figures, the same reference numbers denote similar elements.

DETAILED DESCRIPTION OF THE INVENTION

Figure 1:
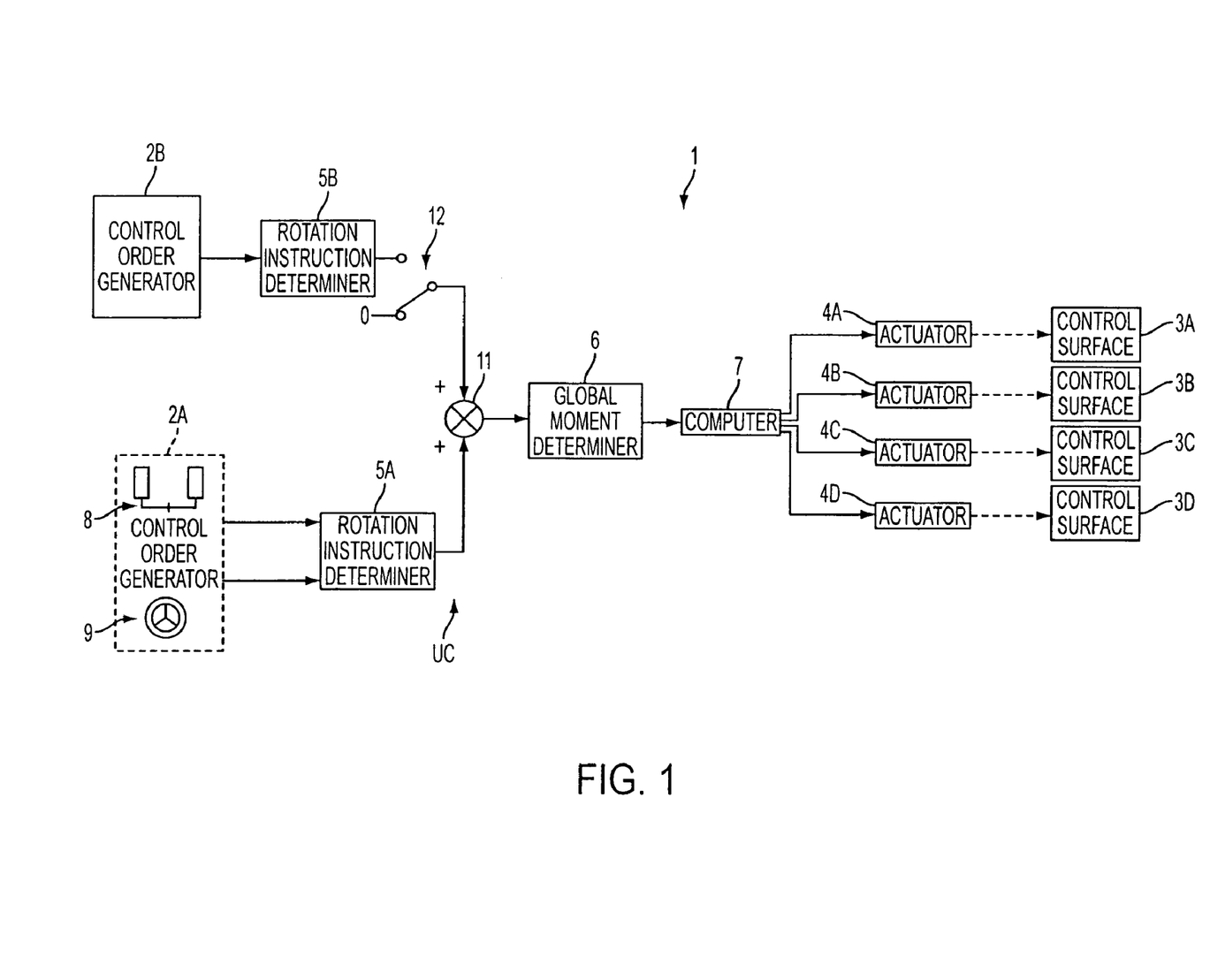
FIG. 1 is the block diagram of a device according to the invention.

The device 1 according to the invention and shown schematically in FIG. 1 is a device for piloting an aircraft A, in particular a civil transport aircraft, traveling on the ground.

Said device 1 is of the type comprising:

means 2A, 2B for generating control orders;

control surfaces 3A, 3B, 3C, 3D each representing a particular means that is capable of acting on the yaw movement of the aircraft A and which is controlled by at least one actuator 4A, 4B, 4C, 4D; and a central unit UC which determines, based on said control orders received from the means 2A, 2B, instructions to be applied to the actuators 4A, 4B, 4C, 4D of said control surfaces 3A, 3B, 3C, 3D.

According to the invention, said central unit UC comprises:

means 5A, 5B for determining an instruction rc to rotate the aircraft A, based on said control orders;

means 6 for determining a global moment Mc having to be applied to the aircraft A about the yaw axis, so that said aircraft A performs said rotation instruction; and means 7:

for dividing said global moment Mc into a sum of elementary moments Mi, each of which corresponds to the effect generated on the aircraft A respectively by said various control surfaces; and for computing, for each of said control surfaces 3A, 3B, 3C, 3D, the instruction to be applied to the actuator of the corresponding control surface such that the latter generates the associated elementary moment.

Thus, thanks to the automatic division of the global moment Mc into a sum of elementary moments Mi and to the computation of the corresponding instructions which are then applied to the actuators 4A, 4B, 4C, 4D of the various control surfaces 3A, 3B, 3C, 3D, the central unit UC is used to choose at each moment the division (between the various control surfaces) that is most appropriate (particularly the most effective), so that the lateral control of the aircraft A is improved about the yaw axis.

In a particular embodiment, when the aircraft A is in manual pilot mode, the means 2A comprise at least one control member 8, 9 which is capable of being actuated by a pilot of the aircraft A and they transmit the orders generated by said control member 8, 9 to the means 5A which deduce therefrom an instruction to rotate the aircraft A (yaw speed of the aircraft, angle of orientation of the speed vector of the aircraft, etc.).

Figure 6:
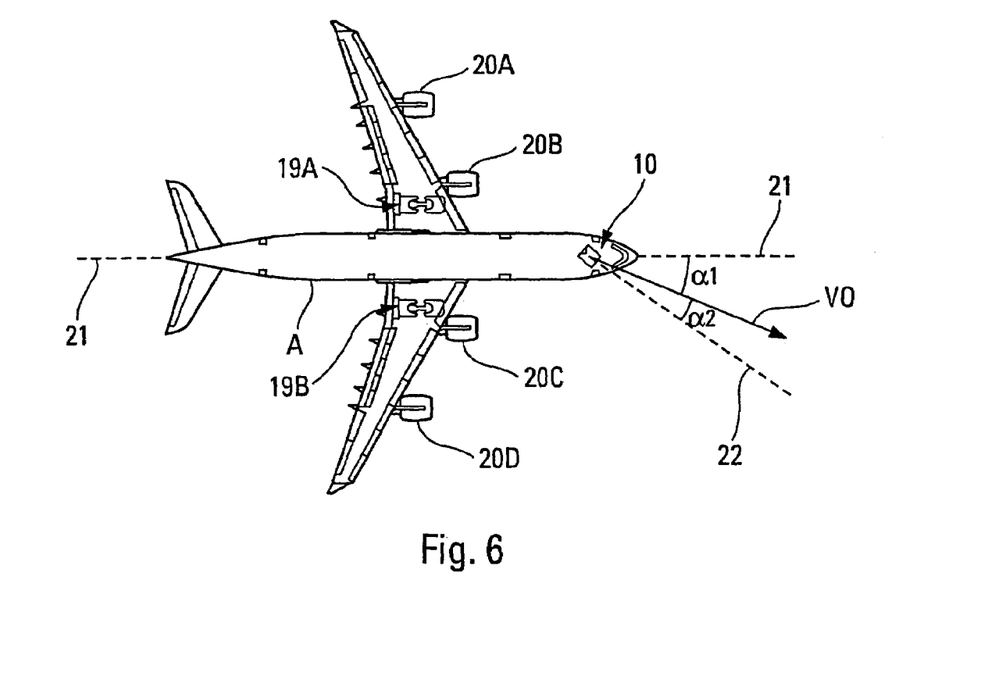
FIG. 6 shows schematically an airplane to which the present invention is applied.

In a preferred embodiment, said means 2A comprise, as control members, in the case of an airplane A as shown in FIG. 6 for example:

a control column 8 of the usual type; and a steering wheel 9 of the usual type, to steer the wheels of the front landing gear 10 of the aircraft A.

This embodiment allows the pilot to enter instructions corresponding to the required lateral control of the aircraft A, without concerning himself with the manner of performing this control by means of the various control surfaces 3A, 3B, 3C, 3D suitable for applying it: the pilot controls a global rotation of the aircraft A rather than an individual movement of each of the control surfaces 3A, 3B, 3C, 3D. Thus, a rotation of the aircraft A when traveling on the ground (runways, taxiways, maneuvering areas, etc.) takes place when the pilot acts on a control member 8, 9, whereas this aircraft A continues traveling straight on when the pilot does not act on said control members 8, 9. It can therefore be considered that the instructions are entered in the form of an objective to be achieved. This results, on the one hand, in an improvement of the ergonomics of piloting due to the reduction of the workload of the pilot, and, on the other hand, in an improvement in the control of the aircraft A along the required trajectory.

In another embodiment, when the aircraft A is in automatic pilot mode, said means 2B determine in the usual manner the center line of the runway on which the aircraft A is traveling by using for example information originating from known systems (ILS, MLS, GLS, DGPS, etc.) and also any difference (or any error) between the effective position of the aircraft A on that runway on the ground and said center line of that runway.

In addition, said means 5B comprise a guidance law for computing an instruction to rotate the aircraft (yaw speed of the aircraft, angle of orientation of the speed vector of the aircraft etc.) which is used to eliminate, where appropriate, said positional error of the aircraft A. Such a guidance law is easy to produce.

In this case, in a particular embodiment, in automatic pilot mode, the device 1 may comprise a summer 11 which produces the sum of the rotation instructions received respectively from said means 5A and 5B and transmits it to the means 6.

On the other hand, in manual pilot mode, only the rotation instructions originating from said means 5A are transmitted to the means 6. To do this, the device 1 also comprises a switch 12 which is provided between the means 5B and the summer 11 and which is reduced to a "0" value during manual piloting of the aircraft A.

It will be noted that said means 6 and 7 are common to the manual and automatic piloting modes. This has the advantage of uniformity of the control laws in these two piloting modes, and easier and less costly fine-tuning and maintenance. The steps taken by these means 6 and 7 are used to achieve automatic rotation control of the aircraft A.

Figure 2:
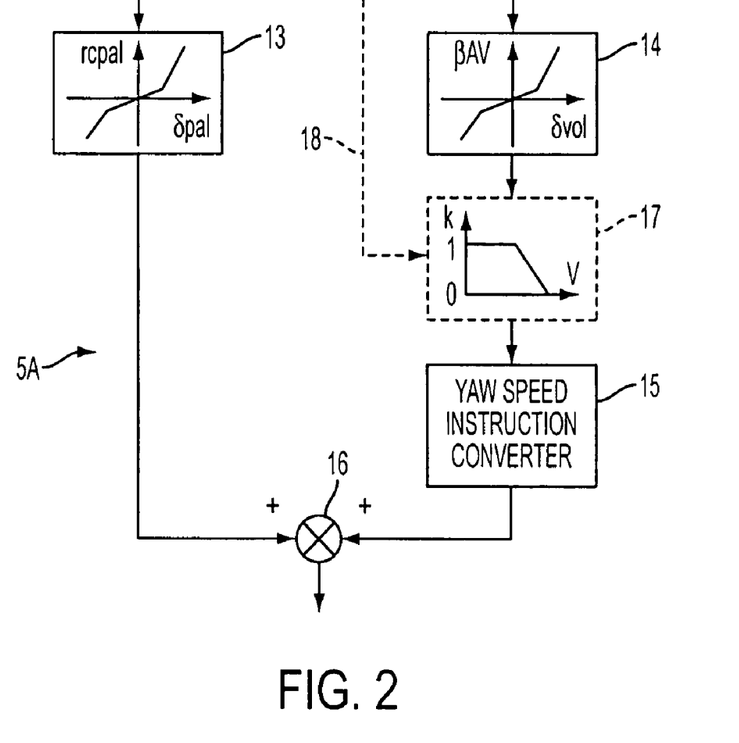
FIG. 2 shows schematically a particular embodiment of means of a device according to the invention.

In a particular embodiment corresponding to manual piloting, the means 5A comprise, as shown in FIG. 2:

means 13 which convert the order δpal generated by the control column 8 directly into a first yaw speed instruction rcpal;

means 14 which convert the order δvol generated by the steering wheel 9 into an intermediate instruction βAV of angle of orientation of the speed vector of the front landing gear 10, which is converted by means 15 into a second yaw speed instruction rcvol; and means 16 which produce the sum of said first and second yaw speed instructions rcpal and rcvol in order to obtain a global yaw speed instruction rcglobal which represents said instruction rc to rotate the aircraft A.

In a variant of this particular embodiment, the means 5A also comprise means 17 (shown in dashed lines) which multiply said intermediate instruction βAV of angle of orientation of the speed vector of the front gear 10, by a limitation coefficient k, which lies between 0 and 1 and which depends on the longitudinal speed V (received via a link 18) of the aircraft A, the result obtained βAVeff being converted into said second yaw speed instruction rcvol by the means 15.

For low values of the longitudinal speed V, (k=1) the effective instruction βAVeff of angle of orientation of the speed vector of the front gear 10 corresponds to the value βAV determined in the manner indicated above, whereas, for high speed values, (k=0), the effective instruction βAVeff of angle of orientation of the speed vector of the front gear 10 is zero. Such a mode of operation is used to perform precise maneuvers (locking the wheels of the front gear 10 at low speed to follow curves, entering taxiways), and following a runway center line, for example in take-off or landing phase (using the orientation of the tail fin rudder control surface when the speed is high, locking the wheels of the front gear 10 at high speed not being recommended for following a runway center line when traveling on take-off and landing).

In the context of the present invention, control surface 3A, 3B, 3C, 3D is understood to be any means used to modify the lateral movement (yaw movement) of the aircraft A. Thus, advantageously, the following can be used as control surfaces 3A, 3B, 3C, 3D:

the tail fin rudder control surface (not shown) of the aircraft A, which is steered, and the front landing gear 10, which is also steered; and/or at least two different landing gears 19A, 19B (FIG. 6) of the aircraft 8, particularly the main right and left gears, the braking of which is controlled in dissymmetrical manner; and/or at least two engines 20A, 20B, 20C, 20D (FIG. 6) of the aircraft A, disposed either side of the longitudinal axis 21 of said aircraft A, the thrust of which is controlled in dissymmetrical manner.

In a preferred embodiment, to divide said global moment Mc into a sum of elementary moments Mi associated respectively with different control surfaces, the means 7 take account of at least one of the following criteria, relating to said control surfaces 3A, 3B, 3C, 3D:

the hierarchy of the control surfaces 3A, 3B, 3C, 3D. Priority levels of the various control surfaces 3A, 3B, 3C, 3D are defined and preferably those that have the highest priority are actuated. The global moment Mc may also be divided between these various control surfaces in proportion to their respective priority levels;

the availability of the control surfaces 3A, 3B, 3C, 3D. To divide the global moment Mc, account is taken of the availability (failures etc.) of the various control surfaces. Thus the unavailability of some of them is compensated by actuating the others;

the effectiveness of the control surfaces 3A, 3B, 3C, 3D. Depending on the point of operation, certain control surfaces are more effective than others (for example, the effectiveness of the tail fin increases with the square of the speed of the aircraft). So preferably, the control surfaces 3A, 3B, 3C, 3D having the most effectiveness at the point of operation in question are used; and the level of authority of the control surfaces 3A, 3B, 3C, 3D. Depending on the point of operation, it may be necessary to limit the use of certain control surfaces. For example, for a speed of the aircraft A greater than a predetermined value, the locking angle of the wheels of the front gear 10 is limited to 6°.

In the embodiments for which the steering of the wheels of the front gear 10 is involved in said division of the moments applied to the aircraft A about the yaw axis, advantageously, this division is particularly a function of the longitudinal speed V of the aircraft A.

In a preferred embodiment, this division is maximal on the steering of said wheels of the front gear 10 when the longitudinal speed V is lower than a first predetermined speed value V1A, then it decreases when the speed V varies between this first predetermined speed value V1A and a second predetermined speed value V2A, and it is minimal when the speed V is higher this the second predetermined speed value V2A.

Figure 3:
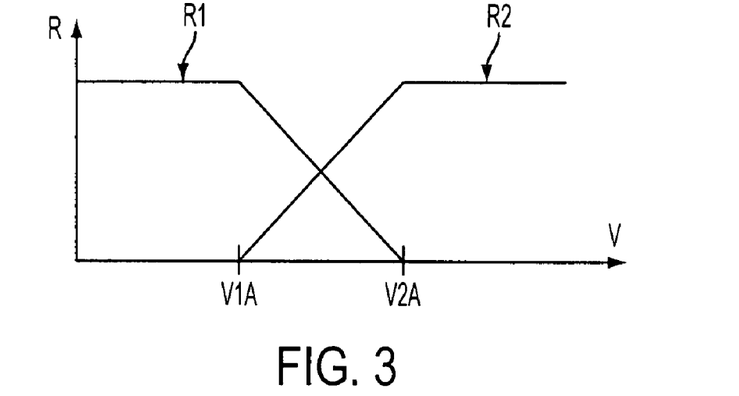
FIGS. 3 and 4 are graphs used to explain various embodiments of the invention.

For example, when the global division R of the moments applied to the aircraft A about the yaw axis involves the orientation of the tail fin rudder control surface (portion R2 in FIG. 3) and the steering of the wheels of the front gear 10 (portion R1 in FIG. 3), the division between the portions R1 and R2 as a function of the longitudinal speed V of the aircraft A may correspond to that represented in FIG. 3.

Thus:

for a low speed V, less than the first value V1A, the lateral guidance of the aircraft A depends only on the steering of the wheels of the front gear 10;

for a speed between the first value V1A and the second value V2A, the action of steering said wheels is degressive to the benefit of the orientation of the tail fin rudder control surface; and for a speed V higher than the value V2A, the lateral control of the aircraft A depends only on the orientation of the tail fin rudder control surface.

This embodiment allows precise maneuvers (locking the wheels of the front gear 10 at low speed to follow curves, or entering taxiways, etc.), and following a runway center line, for example in the take-off or landing phase (orientation of the tail fin rudder control surface when the speed is high, following a runway center line being difficult to achieve by locking the wheels of the front gear 10 at high speed).

In a particular embodiment corresponding to the preceding case, when the longitudinal speed V of the aircraft A is less than a predetermined threshold value V1B, the mode of steering the wheels of the front gear 10 is deactivated according to the invention (control by division mode MCR) and there is a reversion to a direct control CD of that steering by means of the steering wheel 9. Such a mode of operation is advantageous, because, when the speed V of the aircraft A is very low, particularly zero or close to zero, the control by division law according to the invention tends to induce a destabilizing effect and to provoke a maximum locking of said wheels to try to achieve the automatic yaw speed control previously described. Now, according to the value of the yaw speed instruction, such an automatic control cannot be successfully achieved when the speed of the aircraft is zero or very close to zero.

Figure 4:
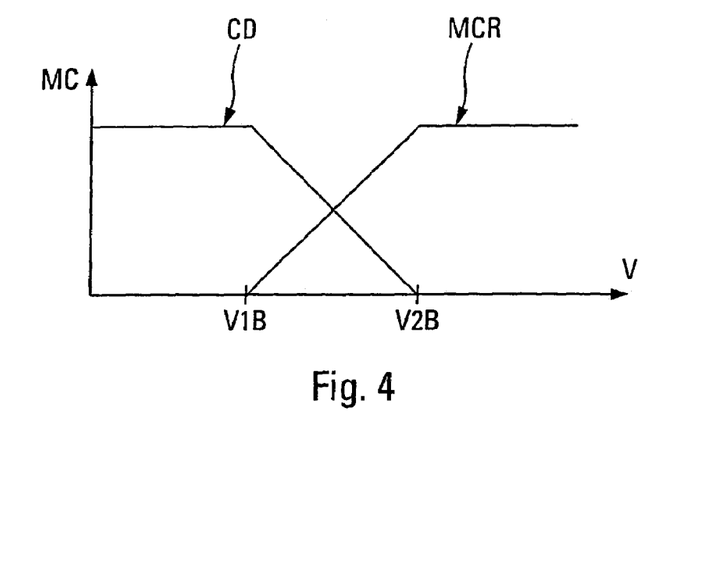

In the example shown in FIG. 4, the choice of the control mode MC between a control by division mode MCR according to the invention and a direct control CD depends, according to the invention, on the value of the longitudinal speed V of the aircraft A relative to the predetermined speed values V1B, V2B. Thus;

when the longitudinal speed V of the aircraft A is lower than a first predetermined speed V1B, the control by division mode MCR is deactivated and only a direct control CD of the front landing gear 10 is applied;

when the longitudinal speed V of the aircraft A is higher than a second predetermined speed V2B, which is higher than said first predetermined speed V1B, the direct control CD is deactivated and only a control by division mode MCR is applied; and between said first and second predetermined speeds V1B and V2B, there is progressive movement from direct control CD to the control by division mode MCR.

Figure 5:
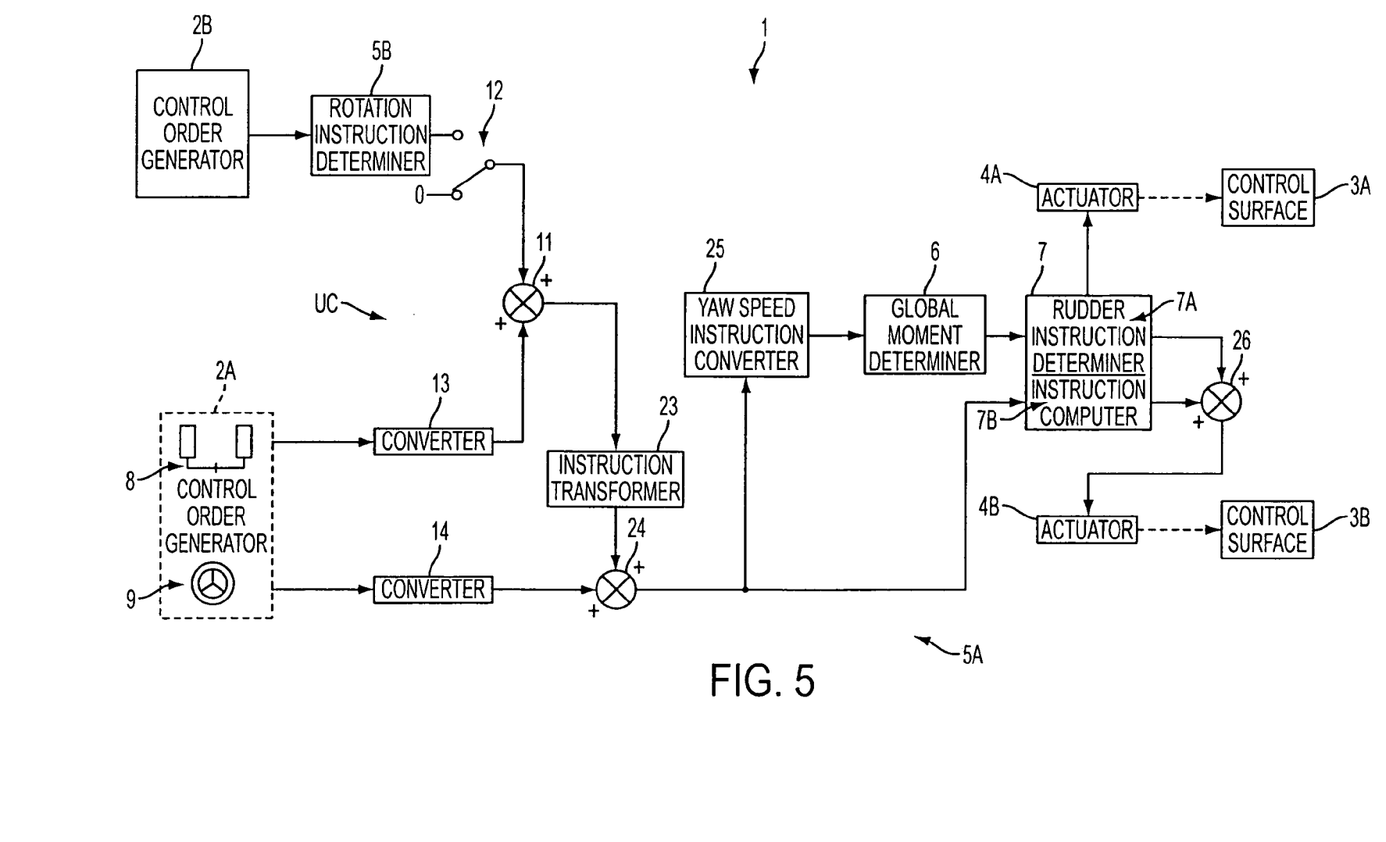
FIG. 5 is the block diagram of a particular embodiment of a device according to the invention.

Furthermore, in a particular embodiment shown in FIG. 5, the means 5A comprise:

said means 14 which convert the order δvol generated by the steering wheel 9 into an instruction βAV1 of angle of orientation of the speed vector of the front landing gear 10;

said means 13 which convert the order δpal generated by the control column 8 into an instruction βAV2 of angle of orientation of the speed vector of the front landing gear 10. This instruction βAV2 is transmitted to the summer 11;

means 23 placed at the output of the summer 11 which transform the information received into an instruction βAV3;

a summer 24 which produces the sum of said instructions βAV1 and βAV3 in order to obtain an instruction βAVc; and means 25 for converting this instruction βAVc into a yaw speed instruction rc which is transmitted to the means 6.

In addition, said means 7 comprise:
a first unit 7A which determines:
the instruction that is applied to the actuator 4A of the rudder control surface 3A of the aircraft; and
an instruction βRA; and
a second unit 7B which computes an instruction kβAVc based on the instruction βAVc originating from the summer 24, by multiplying it by the coefficient k.

The instructions βRA and kβAVc are added by a summer 26 before being applied to the actuator (actuator 4B in FIG. 5) of the front landing gear 10 (control surface 3B in FIG. 5) of the aircraft A.

FIG. 6 shows the speed vector VO of the front landing gear 10 of the aircraft A, the axis 22 of said front landing gear 10, and the longitudinal axis 21 of the aircraft A, which are used to show:
an angle α1 which illustrates said instruction kβAVc; and
an angle α2 which illustrates said instruction βRA.

The latter embodiment consists in generating as an open loop, an instruction kβAVc to steer the wheels of the front gear 10 of the aircraft A, which is added to an orientation instruction βRA originating from the automatic turn control. These two instructions to steer the wheels of the front landing gear 10 are such that, when the rotation of the aircraft A stabilizes about the rotation instruction requested by the pilot (via the pedals of the control column 8 and/or the steering wheel 9), the result of this summation is equivalent to the wheel-steering instruction defined in the preceding embodiment: the open loop instruction then corresponds theoretically to the angle of orientation α1 of the speed vector VO of the front gear 10 of the aircraft A and the wheel-steering instruction originating from the automatic yaw speed control corresponds theoretically to the opposite of the angle of sideslip α2 formed between the speed vector VO and the axis 22 of the wheels of the front gear 10. With such an embodiment, for zero or very low speeds, there is no need for the transition to a direct law previously presented (at these speeds, the output βRA of the automatic turn control is eliminated and all that remains therefore is the instruction kβAVc to steer the wheels of the front gear 10 of the aircraft A, computed as an open loop).

The invention claimed is:

1. A method of piloting an aircraft traveling on the ground, comprising automatically:
   a) determining an instruction to rotate the aircraft;
   b) determining a global moment having to be applied to the aircraft about the yaw axis so that said aircraft performs said rotation instruction;
   c) dividing said global moment into a sum of elementary moments, each of which corresponds to the effect generated on the aircraft respectively by one of a plurality of control surfaces, each of said control surfaces representing a particular section that is capable of acting on the yaw movement of the aircraft and which is controlled by at least one actuator; and
   d) for each of said control surfaces, computing an instruction to be applied to the actuator of the corresponding control surface such that the latter generates the associated elementary moment, wherein:
   the aircraft comprises, as control members, at least one control column and one steering wheel to steer the front landing gear of said aircraft, and
   in step a):
   an order generated by the control column is converted directly into a first yaw speed instruction;
   an order generated by the steering wheel is converted into an intermediate instruction of angle of orientation of the speed vector of the front landing gear, which is converted into a second yaw speed instruction; and
   said first and second yaw speed instructions are added together to obtain a global yaw speed which represents said instruction to rotate the aircraft.

2. The method as claimed in claim 1, wherein, when the aircraft is on manual pilot, said rotation instruction is determined in step a), based on the orders generated by at least one control member of the aircraft which is capable of being actuated by a pilot of said aircraft.

3. The method as claimed in claim 1, wherein, when the aircraft is on automatic pilot, said rotation instruction is determined in step a), based on the possible difference between the position of the aircraft on a runway on the ground and the center line of that runway.

4. The method as claimed in claim 1 wherein, in step a), said rotation instruction is a yaw speed instruction for the aircraft.

5. The method as claimed in claim 1, wherein said intermediate instruction of angle of orientation of the speed vector is multiplied by a limitation coefficient which depends on the longitudinal speed of the aircraft, the result obtained being converted into said second yaw speed instruction.

6. The method as claimed in claim 1, wherein use is made, as a control surface, of at least the tail fin rudder control surface of the aircraft, which is steered, and the front landing gear, which is also steered.

7. The method as claimed in claim 1, wherein use is made, as control surfaces, of at least two different landing gears of the aircraft, the braking of which is controlled in dissymmetrical manner.

8. The method as claimed in claim 1, wherein use is made, as control surfaces, of at least two engines of the aircraft, disposed either side of the longitudinal axis of said aircraft, the thrust of which is controlled in dissymmetrical manner.

9. The method as claimed in claim 1, wherein in step c), to divide said global moment into a sum of elementary moments associated respectively with different control surfaces, account is taken of at least one of the following criteria, relating to said control surfaces:
the hierarchy of the control surfaces;
the availability of the control surfaces;
the effectiveness of the control surfaces; and
the level of authority of the control surfaces.

10. The method as claimed in claim 1, wherein use is made, as a control surface, of at least the front landing gear of the aircraft, which is steered, and wherein, in step c), the global moment is divided as a function at least of the longitudinal speed of the aircraft.

11. The method as claimed in claim 10, wherein:
when said longitudinal speed of the aircraft is lower than a first predetermined speed, the division is maximal on said front landing gear;
when said longitudinal speed of the aircraft is higher than a second predetermined speed which is higher than said first predetermined speed, the division is minimal on said front landing gear; and
said division is decreasing with respect to said front landing gear between said first and second predetermined speeds.

12. The method as claimed in claim 10, wherein:
when said longitudinal speed of the aircraft is lower than a first predetermined speed, the control by division mode is deactivated and a direct control of the front landing gear is applied;

when said longitudinal speed of the aircraft is higher than a second predetermined speed, which is higher than said first predetermined speed, the direct control is deactivated and only a control by division mode is applied; and between said first and second predetermined speeds, control moves progressively from direct control to the control by division mode.

13. The method as claimed in claim 1, wherein use is made, as a control surface, of the front landing gear of the aircraft, which is steered, and wherein the instruction to be applied to the corresponding actuator is the sum of a first front landing gear steering instruction determined in step d) and a second front landing gear steering instruction, generated by a specific open loop.

14. A method of piloting an aircraft traveling on the ground, comprising automatically:
   a) determining an instruction to rotate the aircraft;
   b) determining a global moment having to be applied to the aircraft about the yaw axis so that said aircraft performs said rotation instruction;
   c) dividing said global moment into a sum of elementary moments, each of which corresponds to the effect generated on the aircraft respectively by one of a plurality of control surfaces, each of said control surfaces representing a particular section that is capable of acting on the yaw movement of the aircraft and which is controlled by at least one actuator; and
   d) for each of said control surfaces, computing an instruction to be applied to the actuator of the corresponding control surface such that the latter generates the associated elementary moment, wherein:
   use is made, as a control surface, of at least the front landing gear of the aircraft, which is steered,
   in step c), the global moment is divided as a function at least of the longitudinal speed of the aircraft,
   when said longitudinal speed of the aircraft is lower than a first predetermined speed, the division is maximal on said front landing gear,
   when said longitudinal speed of the aircraft is higher than a second predetermined speed which is higher than said first predetermined speed, the division is minimal on said front landing gear, and
   said division is decreasing with respect to said front landing gear between said first and second predetermined speeds.

15. The method as claimed in claim 14, wherein, when the aircraft is on manual pilot, said rotation instruction is determined in step a), based on the orders generated by at least one control member of the aircraft which is capable of being actuated by a pilot of said aircraft.

16. The method as claimed in claim 14, wherein, when the aircraft is on automatic pilot, said rotation instruction is determined in step a), based on the possible difference between the position of the aircraft on a runway on the ground and the center line of that runway.

17. The method as claimed in claim 14 wherein, in step a), said rotation instruction is a yaw speed instruction for the aircraft.

18. The method as claimed in claim 14, wherein:
   the aircraft comprises, as control members, at least one control column and one steering wheel to steer the front landing gear of said aircraft,
   in step a):
   the order generated by the control column is converted directly into a first yaw speed instruction;
   the order generated by the steering wheel is converted into an intermediate instruction of angle of orientation of the speed vector of the front landing gear, which is converted into a second yaw speed instruction; and
   said first and second yaw speed instructions are added together to obtain a global yaw speed which represents said instruction to rotate the aircraft, and
   said intermediate instruction of angle of orientation of the speed vector is multiplied by a limitation coefficient which depends on the longitudinal speed of the aircraft, the result obtained being converted into said second yaw speed instruction.

19. The method as claimed in claim 14, wherein use is made, as a control surface, of at least the tail fin rudder control surface of the aircraft, which is steered, and the front landing gear, which is also steered.

20. The method as claimed in claim 14, wherein use is made, as control surfaces, of at least two different landing gears of the aircraft, the braking of which is controlled in dissymmetrical manner.

21. The method as claimed in claim 14, wherein use is made, as control surfaces, of at least two engines of the aircraft, disposed either side of the longitudinal axis of said aircraft, the thrust of which is controlled in dissymmetrical manner.

22. The method as claimed in claim 14, wherein in step c), to divide said global moment into a sum of elementary moments associated respectively with different control surfaces, account is taken of at least one of the following criteria, relating to said control surfaces:
   the hierarchy of the control surfaces;
   the availability of the control surfaces;
   the effectiveness of the control surfaces; and
   the level of authority of the control surfaces.

23. The method as claimed in claim 14, wherein use is made, as a control surface, of the front landing gear of the aircraft, which is steered, and wherein the instruction to be applied to the corresponding actuator is the sum of a first front landing gear steering instruction determined in step d) and a second front landing gear steering instruction, generated by a specific open loop.

24. A method of piloting an aircraft traveling on the ground, comprising automatically:
   a) determining an instruction to rotate the aircraft;
   b) determining a global moment having to be applied to the aircraft about the yaw axis so that said aircraft performs said rotation instruction;
   c) dividing said global moment into a sum of elementary moments, each of which corresponds to the effect generated on the aircraft respectively by one of a plurality of control surfaces, each of said control surfaces representing a particular section that is capable of acting on the yaw movement of the aircraft and which is controlled by at least one actuator; and
   d) for each of said control surfaces, computing an instruction to be applied to the actuator of the corresponding control surface such that the latter generates the associated elementary moment, wherein:
   use is made, as a control surface, of at least the front landing gear of the aircraft, which is steered,
   in step c), the global moment is divided as a function at least of the longitudinal speed of the aircraft,
   when said longitudinal speed of the aircraft is lower than a first predetermined speed, the control by division mode is deactivated and a direct control of the front landing gear is applied, when said longitudinal speed of the aircraft is higher than a second predetermined speed, which is higher than said first predetermined speed, the direct control is deactivated and only a control by division mode is applied, and between said first and second predetermined speeds, control moves progressively from direct control to the control by division mode.

25. The method as claimed in claim 24, wherein, when the aircraft is on manual pilot, said rotation instruction is determined in step a), based on the orders generated by at least one control member of the aircraft which is capable of being actuated by a pilot of said aircraft.

26. The method as claimed in claim 24, wherein, when the aircraft is on automatic pilot, said rotation instruction is determined in step a), based on the possible difference between the position of the aircraft on a runway on the ground and the center line of that runway.

27. The method as claimed in claim 24 wherein, in step a), said rotation instruction is a yaw speed instruction for the aircraft.

28. The method as claimed in claim 24, wherein:
the aircraft comprises, as control members, at least one control column and one steering wheel to steer the front landing gear of said aircraft,
in step a):
the order generated by the control column is converted directly into a first yaw speed instruction;
the order generated by the steering wheel is converted into an intermediate instruction of angle of orientation of the speed vector of the front landing gear, which is converted into a second yaw speed instruction; and
said first and second yaw speed instructions are added together to obtain a global yaw speed which represents said instruction to rotate the aircraft, and
said intermediate instruction of angle of orientation of the speed vector is multiplied by a limitation coefficient which depends on the longitudinal speed of the aircraft, the result obtained being converted into said second yaw speed instruction.

29. The method as claimed in claim 24, wherein use is made, as a control surface, of at least the tail fin rudder control surface of the aircraft, which is steered, and the front landing gear, which is also steered.

30. The method as claimed in claim 24, wherein use is made, as control surfaces, of at least two different landing gears of the aircraft, the braking of which is controlled in dissymmetrical manner.

31. The method as claimed in claim 24, wherein use is made, as control surfaces, of at least two engines of the aircraft, disposed either side of the longitudinal axis of said aircraft, the thrust of which is controlled in dissymmetrical manner.

32. The method as claimed in claim 24, wherein in step c), to divide said global moment into a sum of elementary moments associated respectively with different control surfaces, account is taken of at least one of the following criteria, relating to said control surfaces:
the hierarchy of the control surfaces;
the availability of the control surfaces;
the effectiveness of the control surfaces; and
the level of authority of the control surfaces.

33. The method as claimed in claim 24, wherein use is made, as a control surface, of the front landing gear of the aircraft, which is steered, and wherein the instruction to be applied to the corresponding actuator is the sum of a first front landing gear steering instruction determined in step d) and a second front landing gear steering instruction, generated by a specific open loop.

34. A method of piloting an aircraft traveling on the ground, comprising automatically:
a) determining an instruction to rotate the aircraft;
b) determining a global moment having to be applied to the aircraft about the yaw axis so that said aircraft performs said rotation instruction;
c) dividing said global moment into a sum of elementary moments, each of which corresponds to the effect generated on the aircraft respectively by one of a plurality of control surfaces, each of said control surfaces representing a particular section that is capable of acting on the yaw movement of the aircraft and which is controlled by at least one actuator; and
d) for each of said control surfaces, computing an instruction to be applied to the actuator of the corresponding control surface such that the latter generates the associated elementary moment, wherein:
use is made, as a control surface, of the front landing gear of the aircraft, which is steered, and
the instruction to be applied to the corresponding actuator is the sum of a first front landing gear steering instruction determined in step d) and a second front landing gear steering instruction, generated by a specific open loop.

35. The method as claimed in claim 34, wherein, when the aircraft is on manual pilot, said rotation instruction is determined in step a), based on the orders generated by at least one control member of the aircraft which is capable of being actuated by a pilot of said aircraft.

36. The method as claimed in claim 34, wherein, when the aircraft is on automatic pilot, said rotation instruction is determined in step a), based on the possible difference between the position of the aircraft on a runway on the ground and the center line of that runway.

37. The method as claimed in claim 34 wherein, in step a), said rotation instruction is a yaw speed instruction for the aircraft.

38. The method as claimed in claim 34, wherein:
the aircraft comprises, as control members, at least one control column and one steering wheel to steer the front landing gear of said aircraft,
in step a):
the order generated by the control column is converted directly into a first yaw speed instruction;
the order generated by the steering wheel is converted into an intermediate instruction of angle of orientation of the speed vector of the front landing gear, which is converted into a second yaw speed instruction; and
said first and second yaw speed instructions are added together to obtain a global yaw speed which represents said instruction to rotate the aircraft, and
said intermediate instruction of angle of orientation of the speed vector is multiplied by a limitation coefficient which depends on the longitudinal speed of the aircraft, the result obtained being converted into said second yaw speed instruction.

39. The method as claimed in claim 34, wherein use is made, as a control surface, of at least the tail fin rudder control surface of the aircraft, which is steered, and the front landing gear, which is also steered.

40. The method as claimed in claim 34, wherein use is made, as control surfaces, of at least two different landing gears of the aircraft, the braking of which is controlled in dissymmetrical manner.

41. The method as claimed in claim 34, wherein use is made, as control surfaces, of at least two engines of the aircraft, disposed either side of the longitudinal axis of said aircraft, the thrust of which is controlled in dissymmetrical manner.

42. The method as claimed in claim 34, wherein in step c), to divide said global moment into a sum of elementary moments associated respectively with different control surfaces, account is taken of at least one of the following criteria, relating to said control surfaces:
   the hierarchy of the control surfaces;
   the availability of the control surfaces;
   the effectiveness of the control surfaces; and
   the level of authority of the control surfaces.

43. A device for piloting an aircraft traveling on the ground, said device comprising:
   a first section that determines an instruction to rotate the aircraft;
   a second section that determines a global moment to be applied to the aircraft about the yaw axis so that said aircraft performs said rotation instruction;
   a third section that divides said global moment into a sum of elementary moments, each of which corresponds to the effect generated on the aircraft respectively by one of a plurality of control surfaces, each of said control surfaces representing a particular component that is capable of acting on the yaw movement of the aircraft and which is controlled by at least one actuator; and a computer that computes, for each of said control surfaces, an instruction to be applied to the actuator of the corresponding control surface such that the latter generates the associated elementary moment, wherein:

the aircraft comprises, as control members, at least one control column and one steering wheel to steer the front landing gear of said aircraft, and to determine the instruction to rotate the aircraft:
   the order generated by the control column is converted directly into a first yaw speed instruction;
   the order generated by the steering wheel is converted into an intermediate instruction of angle of orientation of the speed vector of the front landing gear, which is converted into a second yaw speed instruction; and
   said first and second yaw speed instructions are added together to obtain a global yaw speed which represents said instruction to rotate the aircraft.

* * * * *